United States Patent [19]

Schneider et al.

[11] Patent Number: 4,773,937
[45] Date of Patent: Sep. 27, 1988

[54] PASTY PIGMENT FORMULATIONS, THE PREPARATION AND USE THEREOF

[75] Inventors: Manfred Schneider, Eppstein/Taunus; Christa Uhde, Kriftel; Manfred Zimmermann, Offenbach am Main, all of Fed. Rep. of Germany

[73] Assignee: Hoechst Aktiengesellschaft, Frankfurt am Main, Fed. Rep. of Germany

[21] Appl. No.: 938,592

[22] Filed: Dec. 5, 1986

[30] Foreign Application Priority Data

Dec. 10, 1985 [DE] Fed. Rep. of Germany ....... 3543520

[51] Int. Cl.$^4$ .............................................. C04B 14/00
[52] U.S. Cl. ................................. 106/493 A; 106/504; 106/499; 524/594; 534/784
[58] Field of Search .............. 106/308 M, 288 Q, 309; 524/504, 594; 534/784

[56] References Cited

U.S. PATENT DOCUMENTS

| | | | |
|---|---|---|---|
| 3,950,288 | 4/1976 | Herbst et al. | 106/308 M |
| 4,224,202 | 9/1980 | Heiberger | 524/379 |
| 4,252,699 | 2/1981 | Tsuchiya et al. | 524/313 |
| 4,317,753 | 3/1982 | Tsuchiya et al. | 524/504 |
| 4,594,411 | 6/1986 | Henning | 106/288 Q |
| 4,627,876 | 12/1986 | Fries et al. | 106/27 |

*Primary Examiner*—Paul Lieberman
*Assistant Examiner*—Willie J. Thompson

[57] ABSTRACT

The invention relates to pasty pigment formulations of pigments of the arylpararosanilinesulfonic acid series, which are free of aromatics-containing mineral oils and are suitable for preparing printing inks, in particular letterpress and offset printing inks. The pigment formulations are obtainable by flushing aqueous presscakes of the pigments by means of the solution of a flushing resin in aromatics-free mineral oil and preparing the flushed paste obtained with an oil- or fatty-acid modified alkyd resin.

17 Claims, No Drawings

PASTY PIGMENT FORMULATIONS, THE PREPARATION AND USE THEREOF

The present invention relates to arylpararosanilinesulfonic acid pigment formulations which are particularly suitable for preparing printing inks, in particular for letterpress and offset printing inks.

It is known to subject aqueous presscakes of pigments from the series of the arylpararosanilinesulfonic acids of the general formula I

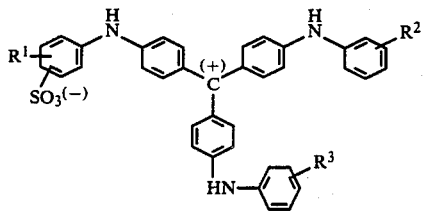

in which $R^1$, $R^2$ and $R^3$ are each independently of one another one of the radicals hydrogen, halogen, such as chlorine or bromine, $C_1$–$C_3$-alkyl, $C_1$–$C_3$-alkoxy or nitro, to flushing, in which the pigment is transferred into a binder and at the same time substantially dewatered and also concentrated. This method produces flushed concentrates which contain the pigment in a thoroughly dispersed form and which can be easily incorporated into a letterpress or offset printing varnish, to produce tinctorially strong letterpress and offset printing inks.

If, on the other hand, the aqueous presscakes are dried, as is customary with many other pigments, the arylpararosanilinesulfonic acid pigments mentioned form, on account of their pronounced polarity, hard agglomerates which the normal mechanical stress of milling in a three-roll mill for preparing the corresponding print pastes is no longer able to break up. The poor dispersibility of the pigments has an adverse effect on the tinctorial strength, homogeneity, gloss and transparency of the printing inks. The dried arylpararosanilinesulfonic acid pigments are therefore as such unsuitable for the use in printing inks. The flushed pigments (flushed pastes) do not have this disadvantage, if the chosen binder is suitable.

The predominantly used binders for flushing arylpararosanilinesulfonic acid pigments comprise one or more resins (flushing resin) and high-boiling, aromatics-containing mineral oil. Such binders are described in DT No. 2,354,225-B2 (U.S. Pat. No. 3,950,288).

Since the use of mineral oils which contain relatively highly fused aromatics is increasingly subject to legal impositions or restrictions, it is desirable, in the interest of a wide range of possible uses of flushed pastes, to use mineral oils or solvents which are free of aromatics.

The solubility of flushing resins in aromatics-free mineral oils is lower than in aromatics-containing mineral oils. Provided certain processing conditions are adhered to, it is nonetheless possible, after replacement of the aromatics-containing mineral oils in the binders by aromatics-free mineral oils, to carry out a flushing process. The flushed pastes obtained, however, have inadequate application properties.

However, flushed pastes of arylpararosanilinesulfonic acid pigments prepared with the commercially customary pigment content analogously to the conventional flushing processes but using flushing resin and aromatics-free mineral oil, do not have the consistency and tackiness required for problem-free printing in letterpress and offset printing.

A further disadvantage of flushed pastes prepared with aromatics-free mineral oil is the pronounced thixotropy. Even after a few hours of storage at 50°–60° C., the previously pumpable pastes become hard and lumpy, so that processing thereof is appreciably more difficult and therefore no longer practicable. There thus exists a demand for arylpararosanilinesulfonic acid pigment formulations which contain no aromatics-containing mineral oil or aromatics-containing solvent and which are suitable for use in printing inks, in particular in printing inks for letterpress and offset printing processes.

The present invention accordingly provides pasty pigment formulations essentially comprising (a) 35–50 percent by weight of one or more pigments of the general formula I

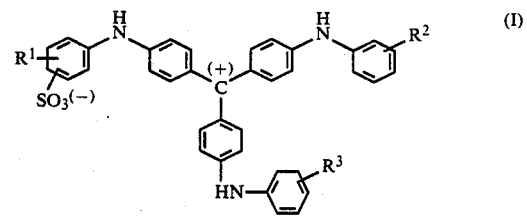

in which $R^1$, $R^2$ and $R^3$ are each independently of one another one of the radicals hydrogen, halogen, such as chlorine or bromine, $C_1$–$C_3$-alkyl, $C_1$–$C_3$-alkoxy or nitro, (b) 2–15 percent by weight of an oil- or fatty acid-modified alkyd resin, (c) a long-oil alkyd resin having an oil content of 70 to 80% by weight, the oils of which are mixtures of drying, semidrying and nondrying oils, the carboxylic acids of which comprise mixtures of i- and o-phthalic acid and small amounts of α, β-unsaturated dicarboxylic acids, and which contain as polyalcohols mixtures of glycerol and pentaerythritol, (d) a hydrocarbon resin having an average molecular weight of 600 to 1700 and (e) 25 to 50 percent by weight of aromatics-free mineral oil, the ratio of (c):(d) varying from 1:1 to 1:1.5.

Particular interest attaches to pigment formulations according to the invention in which the aromatics-free mineral oil has a boiling range of 200°–380° C. Preferred pigment formulations contain 30–45 percent by weight of aromatics-free mineral oil having a boiling range between 200°–320° C., in particular between 250°–300° C. Such aromatics-free mineral oils are commercially available.

The pigment formulations according to the invention contain 2 to 15 percent by weight, preferably 5–10 percent by weight, of an oil- or fatty acid-modified alkyd resin. The oil- or fatty acid-modified alkyd resins are medium-oil or long-oil alkyd resins which are prepared in a known manner from di- or polycarboxylic acids, or anhydrides thereof, and polyols and drying, semidrying or nondrying oils or saturated and/or unsaturated fatty acids.

Suitable di- or polycarboxylic acids or anhydrides for preparing the oil- or fatty acid-modified alkyd resins are for example orthophthalic acid, phthalic anhydride, isophthalic acid, terephthalic acid, hexahydrophthalic acid, 1,2,4-benzenetricarboxylic acid, tetrachlorophthalic anhydride, adipic acid, azelaic acid, 2,2,4-trimethyladipic acid, sebacic acid, dodecanedioic acid, dimerized fatty acids, maleic acid and fumaric acid, preferably phthalic acid and isophthalic acid, and also mixtures of two or three of the compounds mentioned, preferably mixtures with phthalic acid.

Suitable polyols for preparing the oil- or fatty acid-modified alkyd resins are for example glycerol, pentaerythritol, dipentaerythritol, trimethylolpropane, trimethylolethane, neopentylglycol, ethylene glycol, diethylene glycol, 1,2-propylene glycol, 1,2- and 1,4-butanediol, preferably glycerol, and also mixtures of two or more of the compounds mentioned, preferably mixtures with glycerol.

Suitable oils for preparing the oil-modified alkyd resins are for example linseed oil, castor oil, coconut oil, ricinenic oil, sunflower oil, cottonseed oil, soybean oil, peanut oil, tall oil, tallow oil, preferably linseed oil and castor oil, and also mixtures of the oils mentioned.

Suitable fatty acids for preparing the fatty acid-modified alkyd resins are for example fatty acids and fatty acid mixtures which are obtainable by saponifying the aforementioned oils or from fats, in particular beef tallow fat, and also resin acids, straight-chain or branched saturated fatty acids having 7 to 10 carbon atoms, benzoic acid, p-tert-butylbenzoic acid and also mixtures of the acids mentioned.

Both with the oil-modified alkyd resins and the fatty acid-modified alkyd resins, an "oil content" is quoted. The so-called oil content is the proportion by weight expressed in terms of triglycerides, based on the alkyd resin, of the modifying oils of fatty acids which are used in the preparation of the alkyd resin.

Preferred oil- or fatty acid-modified alkyd resins for the formulations according to the invention are long-oil alkyd resins having an oil content of 60–80% by weight, preferably 70–82% by weight, in particular low-viscosity alkyd resins, which are predominantly based on orthophthalic acid and/or isophthalic acid and drying, semidrying and/or nondrying oils, in particular linseed oil or castor oil, and also glycerol, trimethylolpropane and/or pentaerythritol.

The pigment formulations according to the invention further contain a long-oil alkyd resin (component c) and a hydrocarbon resin (component d) in a ratio of 1:1 to 1:1.5. The solution of a mixture of the stated resins in aromatics-free mineral oil (component (e)) in a ratio of 0.25:1 to 1:1 is suitable for flushing aqueous presscakes of the pigments present in the formulations according to the invention.

The long-oil alkyd resin of component (c) has an oil content of 70 to 80% by weight, preferably 75 to 77% by weight. It belongs to a selection of possible oil- or fatty acid-modified alkyd resins of component (b). The alkyd resins of components (c) and (d) can also be of the same composition and are prepared in an analogous and known manner.

The hydrocarbon resin of component (d) of the formulations according to the invention can comprise a hydrocarbon resin or a mixture of hydrocarbon resins, the average molecular weight of each resin being between 600 and 1700. Preferably the hydrocarbon resin of component (d) comprises a mixture of two hydrocarbon resins, of which one has an average molecular weight between 600 and 1100 and the other has an average molecular weight between 1400 and 1700.

Suitable alkyd resins for component (c) and hydrocarbon resins for component (d) of the formulations according to the invention are described in DT No. 2,354,225 (U.S. Pat. No. 3,950,288).

The pigment formulations according to the invention may contain, in addition to components (a) to (e) auxiliaries as further components. Possible auxiliaries are for example preservatives, such as fungicides, or amines as flushing auxiliaries. Like component (e), the other components of the formulations according to the invention must not contain any aromatics-containing solvent.

The present invention also provides the process for preparing the pigment formulations according to the invention which essentially contain the abovementioned components (a), (b), (c), (d) and (e) by flushing aqueous presscakes of pigments of the abovementioned formula (I), which comprises flushing the aqueous pigment presscakes in the presence of a 25–50 percent strength, preferably 25–40 percent strength, solution of a flushing resin in an aliquot of the aromatics-free mineral oil of component (e), the flushing resin essentially comprising components (c) and (d) in a ratio of 1:1 to 1:1.5, and subsequently adding the oil- or fatty acid-modified alkyd resin of component (b) and also the remaining aliquot of the aromatics-free mineral oils of component (e) to, and stripping the remaining water from, the flushed paste obtained.

The solution of the flushing resin in the aromatics-free mineral oil is expediently prepared by heating components (c) and (d) in 50 to 75, preferably 60 to 75 percent by weight, based on the solution, of an aromatics-free mineral oil and, if necessary, filtering. This is done for example as in the preparation of binders A to E in DT No. 2,354,225-B2 (U.S. Pat. No. 3,950,288), except for the difference that in place of the aromatics-containing mineral oil, aromatics-free mineral oil is used and a larger quantity is required of the last-mentioned solvent than of the first-mentioned solvent.

The flushing process can be carried out in a conventional manner by means of divided trough kneaders of conventional design.

The markedly reduced solubility of the abovementioned flushing resins in aromatics-free mineral oils is generally still just sufficient in order to establish the concentrations of flushing resin in the aromatics-free mineral oil which are required for the flushing process. From concentrations of about 25 percent by weight or less of flushing resin in the solution, a flushing process virtually no longer occurs in the customarily used divided trough kneaders. On the other hand, when the solubility limit of the flushing resin in the aromatics-free mineral oil is exceeded, the viscosity is observed to increase markedly. From the aspect of problem-free handling in the field, concentrations above 50 percent by weight of flushing resin in the aromatics-free mineral oil are therefore in most cases not practicable.

The optimal amount of flushing resin and of aromatics-free mineral oil for the flushing process is codependent upon the nature and concentration of the flushing resin and also upon the pigment and must be determined from case to case. In general the weight ratio of flushing resin and aromatics-free mineral oil:pigment in the flushed paste is between 0.7 and 1.3.

The somewhat reduced flushing tendency of the solutions, used according to the invention, of flushing resins in aromatics-free mineral oils, compared with binders based on aromatics-containing mineral oils, can be improved by adding flushing auxiliaries. Suitable flushing auxiliaries are for example primary, secondary, tertiary and quaternary amines or salts thereof, of the type used in corresponding fashion in known flushing processes. Some possible amines are described in U.S. Pat. Nos. 2,271,323, 2,271,324 and 2,282,527.

After the flushing process the bulk of the water which was present in the aqueous pigment presscake is no longer present. To complete the preparation of the pigment formulations, the oil- or fatty acid-modified alkyd resin of component (b) and also further aromatics-free mineral oil is incorporated into the flushed paste, ideally without any prolonged dwelltime after the flushing process, and the paste is stripped of the remaining water. The remaining water can be removed in conventional manner by applying a vacuum. Preferably the alkyd resin of component (b) is incorporated into the flushed paste before vacuum drying, and further aromatics-free mineral oil is subsequently mixed into the paste in the course of vacuum drying.

Sufficient aromatics-free mineral oil is added to the pigment formulations to give the composition according to the invention in a pigment content of 35–50 percent by weight. Depending on the intended use, the tackiness of the pigment formulation can be varied by selecting the amounts of component (b) and of aromatics-free mineral oil.

The present invention also provides the use of the pigment formulations according to the invention for preparing printing inks. The pigment formulations according to the invention are distinguished by excellent properties which appear to make them suitable in particular for preparing letterpress and offset printing inks. For instance, the pigment formulations generally have a tackiness between 8–20, preferably 10–16, inkometer values, measured with the "Inkomat" tackometer from Prüfbau (Munich), as are required of pigment formulations to be used in letterpress and offset printing inks. The measure of tackiness quoted is the torque which is transferred from a roll provided with the formulation to an undriven roll in contact therewith, owing to the tackiness of formulation (1 inkometer value=60 cm.pond; the inkometer value is an instrument-specific value).

The pigment formulations according to the invention have a long shelf life. Even after prolonged storage at 50°–60° C., the pigment formulations have a stable viscosity within the range of 30–70 pa.sec.

Furthermore, the pigment formulations exhibit only a small increase in thixotropy. This thixotropy is determined first on a freshly prepared formulation and then on a sample stored at 60° C. in a hot cabinet for 3 days. The thixotropy is deemed to be measured by a force which must be applied in order to move a sphere of 6 mm diameter in the pigment formulation with an immersion speed of 15 mm per minute. When the pigment formulations according to the invention are stored as described, the thixotropy increases only to the extent which is customary for flushed pastes based on aromatics-containing mineral oils.

By using component (b) according to the invention in the pigment formulations, it is possible to prepare formulations which have a long shelf life and a stable viscosity and also a pigment content which is higher by 10 to 20% than was hitherto obtainable for the aryl-pararosanilinesulfonic acid pigments of particle size about 70–100 m²/g which are used according to the invention.

The pigment formulations according to the invention are distinguished by very wide compatibility with the binder and printing ink systems customary for the various printing processes, such as relief printing, planographic printing, intagilo printing, screen printing or multicolor printing. They can be easily incorporated into binder systems for example in those for letterpress or offset printing inks, heatset offset printing inks, newspaper rotary inks, halftone intagilo printing inks and packaging intagilo printing inks. The printing inks pigmented with the formulations according to the invention have highly satisfactory printing properties and produce tinctorially strong, glossy prints. The pigment formulations according to the invention are suitable in particular in mixtures with black pastes as printing ink and for copy papers and ink ribbons. On printing, the mixtures with black pastes have a high gloss and brightening effect.

In the examples below, parts and percentages are by weight, unless otherwise stated. In some of the examples an "idealized formula" is given for the structure of the pigments used. In these cases, the pigment used contains a mixture of triarylpararosanilinemonosulfonic acids which, as a difference from one another, have the sulfur group bonded to one of the structurally different terminal aryl radicals and which are formed together in the sulfonation of the corresponding triarylpararosaniline.

EXAMPLE 1

240 parts of the pigment of the triphenyl-pararosanilinemonosulfonic acid of the idealized formula

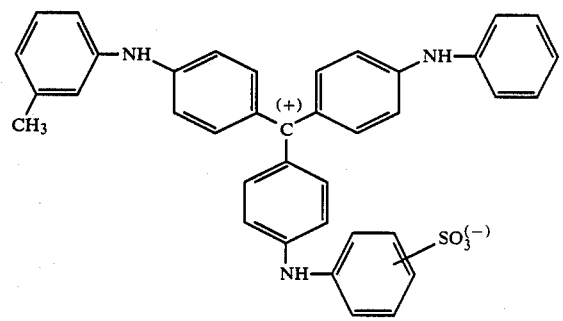

are flushed in the form of an aqueous presscake (937 parts) having a pigment content of 25.6% by weight in a kneader having sigmoid kneader paddles with 195 parts of a 30% strength flushing resin solution, the flushing resin solution being prepared analogous to binder A of DT No. 2,354,225-B2 (U.S. Pat. No. 3,950,288), except for the difference that 1,635 parts of aromatics-free mineral oil of the boiling range 260°–290° C. are used in place of 310 parts of aromatics-containing mineral oil, by first kneading 547 parts of the moist presscake with 146 parts of the 30% strength flushing resin solution and, after about 20 minutes, separating off a quantity of water amounting to 295 parts by tipping the kneader. After the addition of 195 parts of the moist presscake and the slow dropwise addition of 25 parts of the flushing resin solution, 120 parts of water are separated off in the second flushing operation. After the water has been separated off, the remaining 195 parts of presscake are added, followed by 24 parts of flushing resin solution (dropwise), to carry out a third flushing operation. In this way a total of 81% of the water introduced with the presscake is separated off.

Before the remaining amount of water is drawn off in vacuo, the now very viscous knead material is kneaded together with 30 parts of an oil-modified alkyd resin having an oil content of 81% prepared by reacting o-phthalic acid with pentaerythritol and linseed oil and possessing an acid number below 10 and a viscosity of 1,800–2,300 mPa·s/20° C. Furthermore, depending on the required kneading consistency, aromatics-free mineral oil of the boiling range 260°–290° C. is added during the vacuum-drying in an amount of up to 118 parts. The result is a blue pasty pigment formulation having viscosity of 18 Pa·s and a pigment content of 41.2%.

The pigment formulation has a tackiness of 12.3–1.28 inkometer values and consequently is highly suitable for use in printing inks for letterpress or offset printing processes.

In the course of three days of storage at 60° C., the thixotropy of the pigment formulation increases only within the range customary with flushed pastes based on aromatics-containing mineral oils.

The pigment formulation can be mixed with other printing inks by simple incorporation using a dissolver or on a three-roll mill. For example, mixing 1 part of the pigment formulation according to the invention with 4 parts of a black paste composed of 20% carbon black, 75% varnish and 5% wax paste (30% of polyethylene wax in aromatics-free mineral oil) and adding 1% of varnish drier gives a printing ink which on printing has a high gloss and brightening effect.

EXAMPLE 2

(comparative example)

Example 1 is repeated, except that the 30 parts of the oil-modified alkyd resin are not added after flushing and only as much aromatics-free mineral oil is added as gives the pigment formulation has a comparable viscosity of 20 Pa·s. The pigment formulation obtained is extremely thixotropic and has a very high tackiness which goes beyond the measuring range of the inkometer from Prüfubau/Munich and which renders the pigment formulation unsuitable for use in letterpress and offset printing processes. After storage at 60° C. for three days a sample of the pigment formulation becomes hard and in that form is no longer removable from the containers and is not processable.

EXAMPLE 3

(comparative example)

Example 1 is repeated, except that, instead of the oil-modified alkyd resin, 30 parts of the flushing resin (=100 parts of flushing resin solution in aromatics-free mineral oil) which corresponds to that used in the flushing process is used and the pigment content of the paste obtained is standardized with further aromatics-free mineral oil to 41%.

The paste obtained is extremely thixotropic and has a high tackiness which makes the paste unsuitable for use in printing inks for letterpress and offset printing processes.

EXAMPLE 4

240 parts of a triphenylpararosanilinemonosulfonic acid pigment of the formula

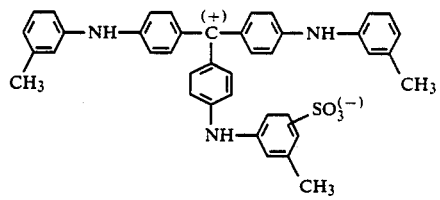

are flushed in the form of an aqueous presscake (879 parts) having a pigment content of 27.3% as described in Example 1. 78% of the water introduced with the presscake is separated and decanted off. Before drying the knead batch in vacuo, 50 parts of the oil-modified alkyd resin having an oil content of 81% described in Example 1 are mixed in. After drying and setting the viscosity of 31 Pa·s with aromatics-free mineral oil of the boiling range 260°–290° C., an extremely tinctorially strong pasty pigment formulation having a pigment content of 45.3% is obtained. The formulation is tinctorially 18% stronger than a paste of comparable viscosity prepared in the same way but without using the oil-modified alkyd resin. The flushed paste is very stable to warm storage and thixotropy.

EXAMPLE 5

Example 1 is repeated, except that, before the flushed knead base is vacuum-dried, 50 parts are added of an oil-modified alkyd resin having an oil content of 70%, prepared by reacting isophthalic acid with pentaerythritol and ricinenic oil, and possessing an acid number below 10 and a viscosity of 250–350 mPa·s in 50% strength solution in white spirit. This gives, after adjustment to the same tinctorial strength, a paste which, in viscosity and pigment content, is comparable to that of Example 1. The tackiness of the paste is 12.9–13.6 inkometer values. The thixotropy of the paste increases on storage only to the extent which is customary with flushed pastes based on aromatics-containing mineral oils.

12 parts of the pigment formulation prepared by the above method are incorporated on a three-roll mill into a paste of 14 parts of carbon black, 18 parts of C.I. Solvent Blue 66 and 56 parts of nondrying oils, and the paste obtained is used for inking an ink ribbon. The prints obtained by means of the ink ribbon have a very high brightening effect.

EXAMPLE 6

240 parts of the pigment of the idealized formula

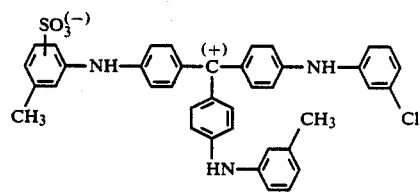

are flushed in the form of an aqueous presscake (980 parts) having a pigment content of 24.5% analogously to Example 1 in three stages using 195 parts of the corresponding flushing resin solution. In total, this removes 87% of the water introduced with the presscake. The viscous knead base obtained after the flushing operations has added to it 70 parts of the oil-modified alkyd resin described in Example 1, and is kneaded. In the subsequent vacuum-drying, aromatics-free mineral oil of the boiling range 280°–310° C. is mixed in a little at a time in an amount of 55 parts, in accordance with the required kneading consistency.

The violet pigment formulation obtained has a viscosity of 36 Pa·s and a pigment content of 42.8%. The pigment formulation is highly stable to warm storage and thixotropy and has a tackiness of 12.3–12.9 inkometer values.

EXAMPLE 7

Example 1 is repeated, except that, after the flushing, 80 parts, in place of 30 parts, of the oil-modified alkyd resin (81% oil content) and, during the vacuum-drying, 53 parts, in place of 118 parts, of aromatics-free mineral oil of the boiling range 260°–290° C. are added, affording a pigment formulation which is highly stable to warm storage and thixotropy and has a pigment content of 42.3%, a viscosity of 52 Pa·s and a tackiness of 15.6–16.3 inkometer values.

The pigment formulation is highly suitable for preparing printing inks for letterpress or offset printing. By simply stirring the pigment formulation into a black paste analogously to Example 1 it is possible to obtain a printing ink which gives excellent results in gloss and brightening effect.

We claim:

1. A pasty pigment formulation essentially comprising
(a) 35–50 percent by weight of one or more pigments of the formula I

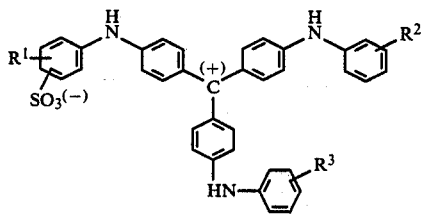

in which $R^1$, $R^2$ and $R^3$ are each independently of one another one of the radicals hydrogen, halogen, $C_1$–$C_3$-alkyl, $C_1$–$C_3$-alkoxy or nitro,
(b) 2–15 percent by weight of an oil- or fatty acid-modified alkyd resin,
(c) a long-oil alkyd resin having an oil content of 70 to 80% by weight, the oils of which are mixtures of drying, semidrying and nondrying oils, the carboxylic acids of which comprise mixtures of i- and o-phthalic acid and small amounts of α, β-unsaturated dicarboxylic acids, and which contain as polyalcohols mixtures of glycerol and pentaerythritol,
(d) a hydrocarbon resin having an average molecular weight of 600 to 1700 and
(e) 25 to 50 percent by weight of aromatics-free mineral oil, the ratio of (c):(d) varying from 1:1 to 1:1.5.

2. The pasty pigment formulation as claimed in claim 1, wherein the aromatics-free mineral oil has a boiling range between 200°–380° C.

3. The pasty pigment formulation as claimed in claim 1, which contains 30–45 percent by weight of aromatics-free mineral oil having a boiling range between 200° and 320° C.

4. The pasty pigment formulation as claimed in claim 1, wherein the oil- or fatty acid-modified alkyd resin is a long-oil alkyd resin having an oil content of 60–85% by weight which is predominantly based on orthophthalic acid and/or isophthalic acid and on drying, semi-drying or nondrying oils or a mixture thereof and on glycerol, trimethylolpropane and/or pentaerythritol.

5. The pasty pigment formulation as claimed in claim 1, which has a tackiness between 8–20 inkometer values suitable for use in printing inks or letterpress and offset printing.

6. The pasty pigment formulation as claimed in claim 1, which has a tackiness between 8 and 20 inkometer values and also contains 30 to 45% by weight of aromatics-free mineral oil within the boiling range between 200° and 380° C. and 2 to 15% by weight of a long-oil alkyd resin having oil content of 60 to 85% by weight which is predominantly based on drying, semidrying or nondrying oils or a mixture thereof and on glycerol, trimethylolpropane and/or pentaerythritol.

7. The pasty pigment formulation as claimed in claim 6, wherein the aromatics-free mineral oil has a boiling range between 200° and 320° C.

8. A process for preparing the pigment formulation defined in claim 1 which essentially contains the components (a), (b), (c), (d) and (e), by flushing the aqueous presscake of pigment of the formula I from claim 1, which comprises flushing the aqueous pigment presscake in the presence of a 25–50 percent strength solution of a flushing resin in an aliquot of the aromatics-free mineral oil of component (e), the flushing resin essentially comprising components (c) and (d) in a ratio of 1:1 to 1:1.5, and subsequently adding the oil- or fatty acid-modified alkyd resin of component (b) and also the remaining aliquot of the aromatics-free mineral oil of component (e) to, and stripping the remaining water from, the flushed paste obtained.

9. The process as claimed in claim 8, wherein the oil- or fatty acid-modified alkyd resin (component b) is incorporated into the flushed paste before removal of the remaining water, and the remaining aliquot of the aromatics-free mineral oil of component (e) is incorporated into the flushed paste in the course of removal of the remaining water from the flushed paste by means of a vacuum.

10. A method of use of the pigment formulation defined in claim 1, which comprises using the pigment formulation for pigmenting printing inks.

11. The method of use as claimed in claim 10, wherein the printing ink is a letterpress printing ink.

12. The method of use as claimed in claim 10, wherein the printing ink is an offset printing ink.

13. The method of use as claimed in claim 10, wherein the printing inks for copy paper and ink ribbons are pigmented.

14. A process for preparing a pasty pigment formulation, said formulation comprising:
(a) 35–50 percent by weight of one or more pigments of the formula I

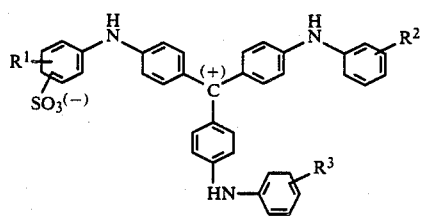

in which $R^1$, $R^2$ and $R^3$ are each independently of one another one of the radicals hydrogen, halogen, $C_1$–$C_3$-alkyl, $C_1$–$C_3$-alkoxy or nitro,
(b) 2–15 percent by weight of a oil- or fatty acid-modified alkyd resin,
(c) a long-oil alkyd resin having an oil content of 70 to 80% by weight, the oils of which are mixtures of drying, semidrying and nondrying oils, the carboxylic acids of which comprise mixtures of i- and o-phthalic acid and small amounts of $\alpha$, $\beta$-unsaturated dicarboxylic acids, and which contain as polyalcohols mixtures of glycerol and pentaerythritol,
(d) a hydrocarbon resin having an average molecular weight of 600 to 1700 and
(e) 25 to 50 percent by weight of aromatics-free mineral oil, the ratio of (c):(d) varying from 1:1 to 1:1.5;
said process comprising:
flushing the aqueous pigment presscake in the presence of a 25–50 percent strength solution of a flushing resin in an aliquot of the aromatics-free mineral oil of component (e), the flushing resin essentially comprising components (c) and (d) in a ratio of 1:1 to 1:1.5, and subsequently adding the oil- or fatty acid-modified alkyd resin of component (b) and also the remaining aliquot of the aromatics-free mineral oil of component (e) to, and stripping the remaining water from, the flushed paste obtained.

15. The process as claimed in claim 14 wherein the oil- or fatty acid-modified alkyd resin (component b) is incorporated into the flushed paste before removal of the remaining water, and the remaining aliquot of the aromatics-free mineral oil of component (e) is incorporated into the flushed paste in the course of removal of the remaining water from the flushed paste by means of a vacuum.

16. A pasty pigment formulation made by the process of claim 14.

17. A pasty pigment formulation made by the process of claim 15.

* * * * *